(12) United States Patent
Allford

(10) Patent No.: US 7,281,319 B1
(45) Date of Patent: Oct. 16, 2007

(54) APPARATUS FOR MANUFACTURING WIRE WOUND FILTER SCREENS

(76) Inventor: Daniel Allford, 7775 Little York, Houston, TX (US) 77016

( * ) Notice: Subject to any disclaimer, the term of this patent is extended or adjusted under 35 U.S.C. 154(b) by 516 days.

(21) Appl. No.: 10/834,545

(22) Filed: Apr. 30, 2004

(51) Int. Cl.
*B23P 21/00* (2006.01)

(52) U.S. Cl. .................. 29/703; 29/709; 29/714; 29/819; 219/81; 219/83

(58) Field of Classification Search .............. 29/896.6, 29/896.61, 896.62, 407.01, 407.05, 407.09, 29/407.1, 464, 525.14, 559, 703, 705, 707, 29/709, 714, 721, 819; 219/81, 82, 83, 84; 166/227, 228, 231
See application file for complete search history.

(56) References Cited

U.S. PATENT DOCUMENTS

| | | | |
|---|---|---|---|
| 3,826,576 A * | 7/1974 | Stewart ..................... 356/391 |
| 3,958,634 A | 5/1976 | Smith, III |
| 4,260,016 A | 4/1981 | Calderon |
| 4,293,037 A | 10/1981 | Calderon |
| 4,314,129 A * | 2/1982 | Wilson et al. ................ 219/58 |
| 4,315,125 A * | 2/1982 | Schmidt et al. ............... 219/56 |
| 4,494,603 A | 1/1985 | Harguindey |
| 4,780,589 A * | 10/1988 | Davies ........................ 219/84 |
| 5,411,084 A | 5/1995 | Padden |
| 5,787,980 A | 8/1998 | Sparlin et al. |
| 5,938,925 A | 8/1999 | Hamid et al. |
| 6,298,914 B1 | 10/2001 | Spray et al. |

FOREIGN PATENT DOCUMENTS

JP    06297175 A  * 10/1994

\* cited by examiner

*Primary Examiner*—Jermie E. Cozart
(74) *Attorney, Agent, or Firm*—Egbert Law Offices

(57) ABSTRACT

An apparatus for manufacturing a wire wound filter screen from wrapping wrap wire over a set of rib wires has a frame, a spindle for supporting the rib wires in a longitudinal orientation, a wire guide for delivering wrap wire around the rib wires as the spindle rotates the rib wires, an electrode for welding the wrap wires to the rib wires at each intersection thereof, and a translating mechanism positioned on the frame for moving rib wires and the welded wrap wire longitudinal along the frame. A laser measures a gap between adjacent surfaces of wrap wire. A processor is used to adjust the translating of the rib wires relative to the gap. An air cushion urges the electrode against the wrap wire.

13 Claims, 3 Drawing Sheets

APPARATUS FOR MANUFACTURING WIRE WOUND FILTER SCREENS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to sand control devices used during the production of oil, gas or water. More particularly, the present invention relates to sand control screens having a gap profile suitable for preventing sand intrusion through the filter screen. More particularly, the present invention relates to apparatus and methods for manufacturing such filter screens and for controlling the size of the gaps between adjacent surfaces of the wrap wire around the screen.

BACKGROUND OF THE INVENTION

Since the beginning of oil production from subsurface formations, the industry has been concerned with efficient control of the movement of unconsolidated formation particles, such as sand, into the wellbore. For example, such particle movement commonly occurs during production from completions in loose sandstone or following hydraulic fracture of a formation. Production of these materials causes numerous problems in the operation of oil, gas or water wells. These problems include plugging of formations, tubing and subsurface flow lines, as well as erosion of tubing, downhole equipment and surface equipment. These problems lead to high maintenance costs and unacceptable well downtime. Accordingly, numerous methods have been utilized to control the movement of unconsolidated particles during the production of fluids.

Gravel packing is one of the most common methods to prevent the production of sand. Generally, gravel packing involves placing pack sand, an aggregate of particulate material, in the annular space between the wellbore and a fluid permeable, perforated base pipe that is located adjacent to the production zone. A particular pack sand is selected to prevent the flow of formation particles therethrough, taking into consideration the characteristics of the particular reservoir. The perforated base pipe is designed to allow production fluids to flow therethrough with minimum resistance, while preventing both the pack sand and the formation particles from flowing into the production string. Gravel packing is commonly achieved by either an open hole gravel packing procedure or an internal gravel packing procedure, depending on the characteristics of the particular reservoir.

In addition to the use of a perforated base pipe and gravel packing, a sand control screen is commonly employed to control the movement of formation particles. These screens may comprise a continuous single wire wrapped around the base pipe. While this type of screen is capable of excluding even the smallest API grades of pack sand, these screens are easily damaged during handling, installation and production.

More recently, a sand control screen comprising a sand control screen jacket has been used. The screen jacket is fully formed from a single wire prior to attachment to the base pipe. Commonly, a plurality of ribs extend longitudinally along the internal surface of the screen jacket to provide strength to the wire and a stand-off between the wire and the base pipe once the screen jacket is attached. In addition, some screen designs use prepacked sand confined around the perforated base pipe. These prepacked screens are constructed by fabricating the metal components, then forcing pack sand, either resin coated or uncoated, between the perforated base pipe and an inner wire screen or between an inner wire screen and an outer wire screen of a multi-layer screen.

In the past, various U.S. patents have issued relating to such filter screens. For example, U.S. Pat. No. 3,958,634, issued on May 25, 1976 to H. F. Smith III, describes a welded wire well screen on a perforated casing. The wire screen sleeve has longitudinal wires arranged in a generally cylindrical shape. An external wrapping wire is welded thereto. This screen is positioned over a perforated pipe having an external diameter substantially equal to the internal diameter of the sleeve. Annular welds are provided between each end of the wire screen and the pipe so as to close the space therebetween and to secure the sleeve to the pipe.

U.S. Pat. No. 4,260,016, issued on Apr. 7, 1981 to R. Calderon, describes a self-cleaning helical spring sand screen. This sand screen includes a hydraulically-actuated spring-based spool valve connected to the upper end of the sand screen for receiving liquid under high pressure, for storing energy in the spring, for expanding the helical spring sand screen, and for ejecting liquid into the helical spring sand screen for cleaning thereof.

U.S. Pat. No. 4,293,037, issued on Oct. 6, 1981 to R. Calderon, describes a method of forming and assembling the self-cleaning helical spring screen of the type disclosed in U.S. Pat. No. 4,260,016.

U.S. Pat. No. 4,494,603, issued on Jan. 22, 1985 to J. E. Harguindey, describes an improved wire mesh well screen which is defined by a helically-wrapped strip of wire mesh which is supported by a rigid cage-like structure of welded steel longitudinal support rod and helical wrap wires. The wire mesh strip is helically wound with a gap and at least one wrap wire is helically wound in the gap so that a small portion of its width can be firmly adhered to the rods while at least another portion of its width overlies an adjacent side edge of the mesh strip.

U.S. Pat. No. 5,411,084, issued on May 2, 1995 to J. B. Padden, teaches a sand filter system for use in a well. A tubular wedge wire screen is telescopically positioned on the tubing covering the perforations. A plurality of tubular corrugated filter elements are then positioned on the wedge wire screen in an end-to-end relationship. Each of the filter elements is formed of diffusion bonded multiple layers of wire mesh and each of the filter elements is corrugated to provide an external surface having an area at least three times the area of the cylindrical external surface of the tubular wedge wire screen that is encompassed by each filter element.

U.S. Pat. No. 5,787,980, issued on Aug. 4, 1998 to Sparlin et al., describes a well screen having a uniform diameter. Each of the screen units has a cylindrical connecting section at least at one end thereof and includes a plurality of support rods extending in the axial direction of the screen and disposed cylindrically about a section of the screen other than the connecting section at a predetermined interval in the circumferential direction of the screen. A wire is wound on the outer periphery of the support rod so as to form slits of a predetermined width.

U.S. Pat. No. 5,938,925, issued Aug. 17, 1999, to Hamid et al., teaches a progressive gap sand control screen having a plurality of parallel ribs spaced about an axis and a screen wire wrapped around the plurality of ribs having turns which extend along the length of the plurality of ribs such that adjacent turns have gaps therebetween. The gaps form a gap profile in which the gaps near the upper end of the sand control screen are narrower than the gaps near the lower end of the sand control screen. The width of the gaps near the upper end of the sand control screen are less than the diameter of the particles which cause erosion. The gap profile includes a variable gap section near the upper end of the sand control screen and a constant gap section below the variable gap section.

U.S. Pat. No. 6,298,914, issued on Aug. 9, 2001 to Spray et al., describes a wire-wrapped well screen for placement within wells and used to filter out impurities from the fluid entering the well. The well screen includes a spirally-wound wire forming a cylinder with gaps between the layers of the wire. The layers of the wire are attached by spacers placed within the gaps.

FIG. 1 is an illustration of a prior art technique for forming such wire wound filter screens. The process 1 of the prior art includes placing a plurality of ribs 2 into a carrier mechanism 3 which has an axis of rotation 4. Ribs 2 are spaced around and oriented around axis 4 to form a generally cylindrical shell for the screen 5. Carrier mechanism 3 is rotated about the axis of rotation 4 and laterally advanced while the screen wire 6 is wrapped around the ribs 2 forming adjacent turns which have gaps therebetween such as turns 7, 8 and 9. The screen wire 6 is also known as "wrap wire". The screen wire 6 is adhered to each of the ribs 2 by welding mechanism 10.

The gap profile of screen 5 is a function of the linear velocity and the angular velocity of the carrier mechanism 3. By varying either the linear velocity or the angular velocity of carrier mechanism 3, the desired gap profile may be obtained. For example, the gap profile in which the gaps is near the upper end of the screen 5 are narrower than the gaps near the lower end of the screen 5 may be achieved by increasing the linear velocity of carrier mechanism 3 while maintaining a constant angular velocity or decreasing the angular velocity of carrier mechanism 3 while maintaining a constant linear velocity as the carrier mechanism 3 laterally advances.

Unfortunately, it has been found that one of the failures of the technique shown in FIG. 1 is the inability to accurately account for variation in wire diameter. Wire manufacturing processes are such that the wire may tend to increase or decrease in diameter during the manufacturing processes. As such, with the technique shown in FIG. 1, if relatively wide diameter wire is wound next to relatively wide diameter wire, the gap will be too small to be effective. On the other hand, if the wire diameter is narrow, then the gap between adjacent surfaces of the wrap wire 6 will be too large and would allow sand intrusion. As such, a need has developed to be able to control the wrapping of the wire screen 5 while controlling the gap space between the adjacent surfaces of wire. This is necessary to overcome the inability of wire manufacturers to accurately control the wire diameter over long lengths of production.

It is an object of the present invention to provide an apparatus and method for manufacturing wire wound filter screens.

It is another object of the present invention to provide an apparatus and method whereby the gaps between adjacent surfaces of the wrap wire are accurately controlled.

It is a further object of the present invention to provide an apparatus and method for manufacturing wire wound filter screens in which a rolling electrode constantly contacts the surface of the wrap wire during the production of the filter screen.

It is further object of the present invention to provide an apparatus and method for manufacturing wire wound filter screens which effectively prevents arcing of the electrode during the welding process and also avoids the pitting of the wire by virtue of the arcing.

It is further object of the present invention to provide an apparatus and method for manufacturing wire wound filter screens which effectively controls the translation of the rib wires relative to the size of gaps that are produced between adjacent surfaces of wrap wire.

It is another object of the present invention to provide an apparatus and method for manufacturing wire wound filter screens which is easy to use and relatively inexpensive.

These and other objects and advantages of the present invention will become apparent from a reading of the attached specification and appended claims.

BRIEF SUMMARY OF THE INVENTION

The present invention is an apparatus for manufacturing wire wound filter screens comprising a frame, a spindle means rotatably mounted on the frame for supporting rib wires in a longitudinal orientation, a wire guide means positioned adjacent to the spindle for delivering wrap wire around the rib wires as the spindle rotates the rib wires, an electrode for welding the wrap wire to the rib wires at each intersection of wrap wire and rib wires, and a translating means positioned on the frame for moving rib wires and the welded wrap wires longitudinally along the frame. The electrode is a rolling electrode having a periphery in contact with the wrap wire as the wire guide delivers wrap wire onto rib wires.

In the present invention, a laser is positioned adjacent to the spindle on the frame. This laser serves to measure a gap between adjacent surfaces of the wrap wire as the wrap wire is welded to the rib wires. A processor is connected to laser for controllably connecting to the translating means so as to adjust a rate of translation of the rib wires relative to the measured gap. An air cushion is connected to the electrode for urging the rolling electrode to maintain contact with the wrap wire during the rotation of the spindle. An air bladder structure is cooperatively interconnected to the rolling electrode. The air bladder structure includes an upper chamber having at least one air bladder therein, and a lower chamber coupled to the air bladder. The rolling electrode is rigidly mounted on the lower chamber. A strain gage load cell is coupled to the air bladder structure for measuring and controlling the application of forces by the air bladder onto the rolling electrode. The processor can be used for producing a humanly perceivable display indicative of the measured gap by the laser means.

The present invention is also a method of forming a spiral wound filtering screen comprising the steps of: (1) rotating a set of rib wires; (2) wrapping a wrap wire around the set of rib wires; (3) welding each intersection of wrap wire with one of the rib wires; (4) measuring a gap between adjacent surfaces of the welded wrap wire; and (5) adjusting a rate of translation of the set of rib wires relative to the measured gap. In this method, the step of measuring includes directing a laser beam toward the gap and detecting reflected light from the laser beam so as to produce a signal indicative of the measured gap. In the present invention, the step of welding includes rolling an electrode along a surface of the wrap wire as the wrap wire is wrapped, and then firing the electrode upon contact of the wrap wire with the rib wires. The method further includes the step of air cushioning the electrode as the electrode rolls along the wrap wire so as to apply an even and controlled pressure against the wrap wire.

DETAILED DESCRIPTION OF THE INVENTION

Figure 1:
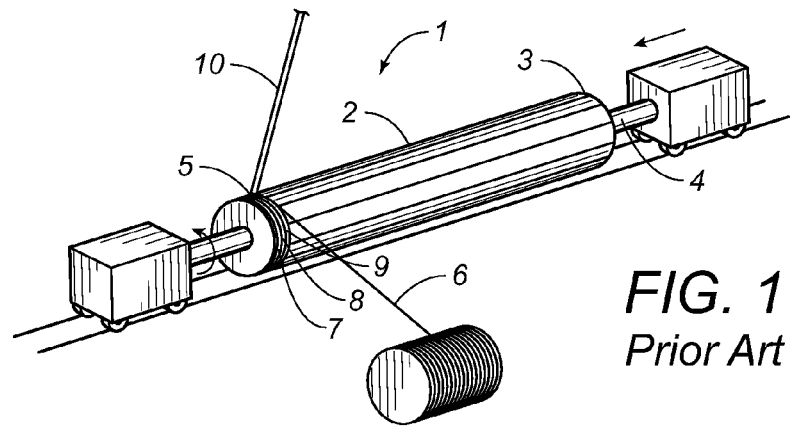
FIG. 1 is a perspective view of a prior art system for the manufacturing of spiral wound filtering screens.
Figure 2:
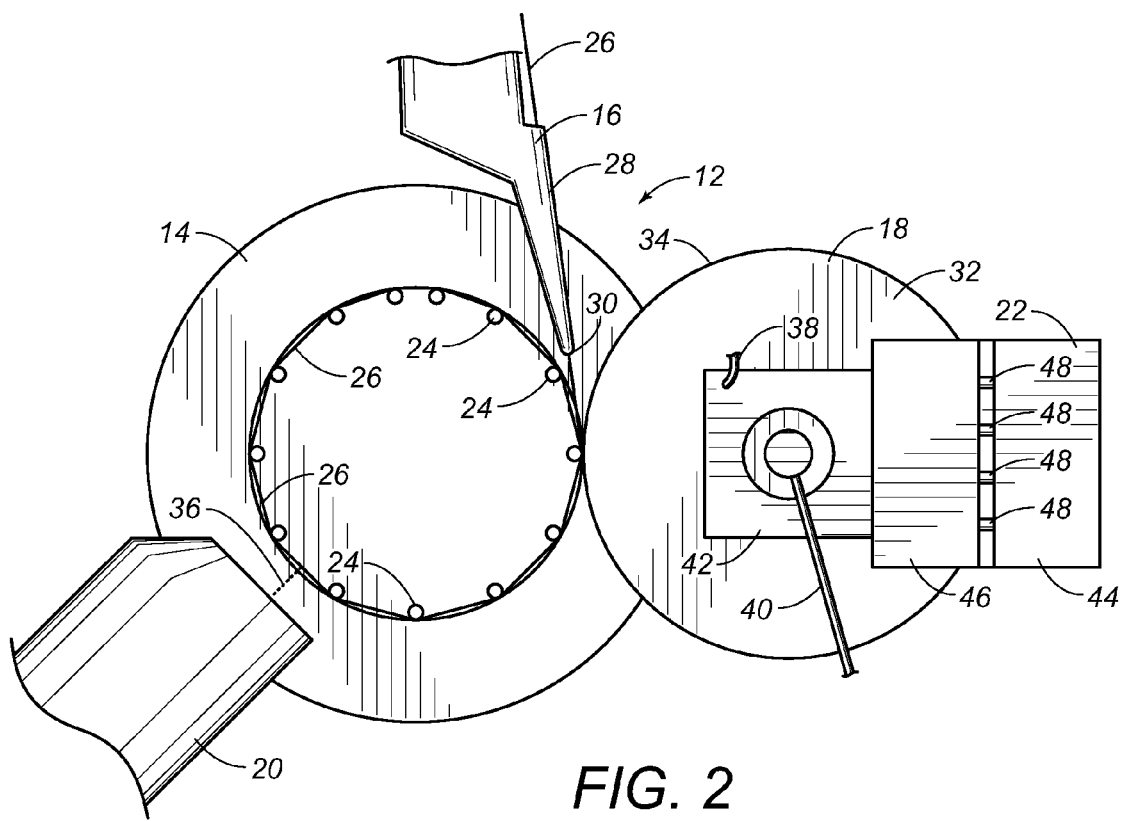
FIG. 2 illustrates the apparatus and method of the present invention for the welding wrap wire onto the rib wires of the filter screen.

Referring to FIG. 2, there is shown the apparatus 12 of the present invention for manufacturing wire wound filter screens. The apparatus 12 includes a frame (not shown), a spindle 14 rotatably mounted on the frame, a wire guide 16 positioned adjacent to the spindle 14, an electrode 18 positioned adjacent to the spindle 14 and the wire guide 16, and a translating mechanism (not shown). A laser 20 is positioned adjacent the spindle on the frame. An air cushion 22 is connected to the electrode 18.

In the present invention, the spindle 14 serves to support the rib wires 24 in a generally longitudinal orientation. As the wire guide 16 delivers wire 26 onto the rib wires 24, the spindle 14 will suitably rotate the rib wires so that the wrap wire 26 is delivered around the rib wires 24. The wire guide 16 includes an interior slot adjacent to the surface 28 so as to allow the wrap wire 26 to travel therethrough. The delivery end 30 of the wire guide 16 is positioned in proximity to the rib wires 24 so that the wrap wire 26 is delivered in close proximity to the rotating rib wires 24.

The electrode 18 serves to weld to the wrap wire 26 to the rib wires 24 at each intersection of the wrap wire 26 with the rib 24. In particular, the electrode 18 is a rolling electrode 32 which has an outer periphery 34 in contact with the wrap wire 26 as the wire guide 16 delivers the wrap wire 26 onto the rib wires 24.

The laser 20 is positioned adjacent to spindle 14. The laser 20 emits a laser beam 36 toward the wrap wire 26, as extended over the rib wires 24. The laser 36 serves to measure a gap between adjacent surfaces of the wrap wire 26 as the wrap wire is welded to the rib wires 24. The laser 20 is shown in a stationary position. Invariably, the full gaps between adjacent surfaces of wrap wire 26 will be presented to the laser 20 as the translating mechanism moves the rib wires 24 longitudinally. The laser 20 will detect the reflected laser beam so as to produce a signal indicative to the gap between the adjacent surfaces of rib wire 24. The laser 20 will be suitably connected to a processor.

The electrode 18 is a rolling electrode 32 which will fire approximately 15,000 amps for the purposes of welding wrap wire 26 to the rib wires 24. As such, the electrode 32 will fire whenever contact is made between the periphery 34 of the electrode 32 and the rib wire/wrap wire intersection. Line 38 and 40 serve to deliver power to the rolling electrode 32. Importantly, the block 42 rotatably receives the rolling electrode 32 thereon. Block 42 is rigidly mounted to air cushion 22. The air cushion 22 is suitably mounted to the block 42 and, hence, to the electrode 32 so as to urge the rolling electrode 32 to maintain contact with the wrap wire 26 during the rotation of the spindle 14. The air cushion 22 includes an air bladder structure interior thereof which is cooperatively connected to the rolling electrode 32. The air cushion 22 includes an upper chamber 44 having an air bladder therein and a lower chamber 46 coupled to the air bladder within the upper chamber 44. As can be seen, the rolling electrode 32 is rigidly mounted to the lower chamber 46. As will be described hereinafter, four rods 48 couple the lower chamber 46 to the air bladders within the upper chamber 44.

Importantly, in FIG. 2, it can be seen that when the wrap wire 26 is applied onto the rib wire 24, the shape of the filter screen is in the shape of a polygon. As such, the exterior surface of the filter screen is not entirely round but a combination of flat surfaces and ridges. When the spindle 14 is rotating the rib wires 24, the rolling electrode 32 must quickly (i.e. approximately 80 times per second) move up and down in order to follow the shape of the finished well screen. If the rolling electrode 32 fails to follow the contour of the filter screen, arcing occurs between the rolling electrode 32 and the wrap wire 26. This will result in unacceptable pitting. The air cushion mechanism 22 acts as a counterbalance in order to neutralize the weight of the lower chamber 46 and the rolling electrode 32. The upper chamber 44, along with its associated air bladders, is used to apply the desired force to the rolling electrode 32. A suitable strain gauge-type load cell can be used so as to monitor the force applied to the rolling electrode 32 during the welding process.

Figure 3:
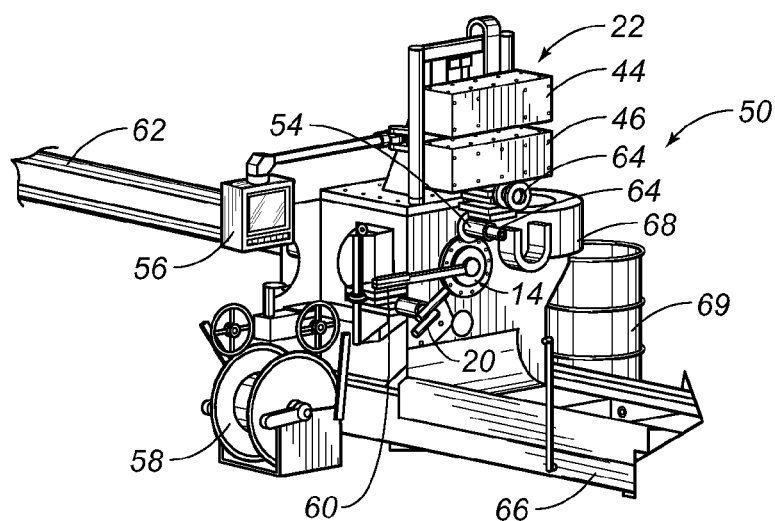
FIG. 3 is a perspective view of the welding apparatus of the present invention.

FIG. 3 shows an overall layout view of the welding system 50 of the present invention. As can be seen, the air cushion 22 is provided with the upper chamber 44 and the lower chamber 46. The welding head assembly 52 is illustrated as having the rolling electrode 54 connected thereto. A monitor 56 is interconnected to the welding head 52 and to the laser 20 so as to provide a visual indication of the gap between adjacent surfaces of the wrap wire on the filter screen. A spool 58 is illustrated of the type suitable for containing wire thereon. Spool 58, along with its associated mechanisms, will act as a wire dereeler for the wrap wire. A wire straightener assembly 60 is positioned adjacent to the welding head 52 so as to deliver straightened wire to the wrap wire in the filter screen assembly. Spindle 14 is illustrated in a suitable position for receiving the rib wires extending therethrough. A clam-shell assembly 76 is provided at one end of the spindle 14 so as to receive the wrap-on pipe. A Z-axis motor, motor brake and gear reduction unit 64 are located in association with the spindle 14 and positioned slightly above the spindle 14 on the frame 66 of the welding system 50. A power supply 68 located on the frame 66 so as to supply power to the welding head 52. A coolant system 69 is located adjacent to the frame 66 of the machine 50.

Figure 4:
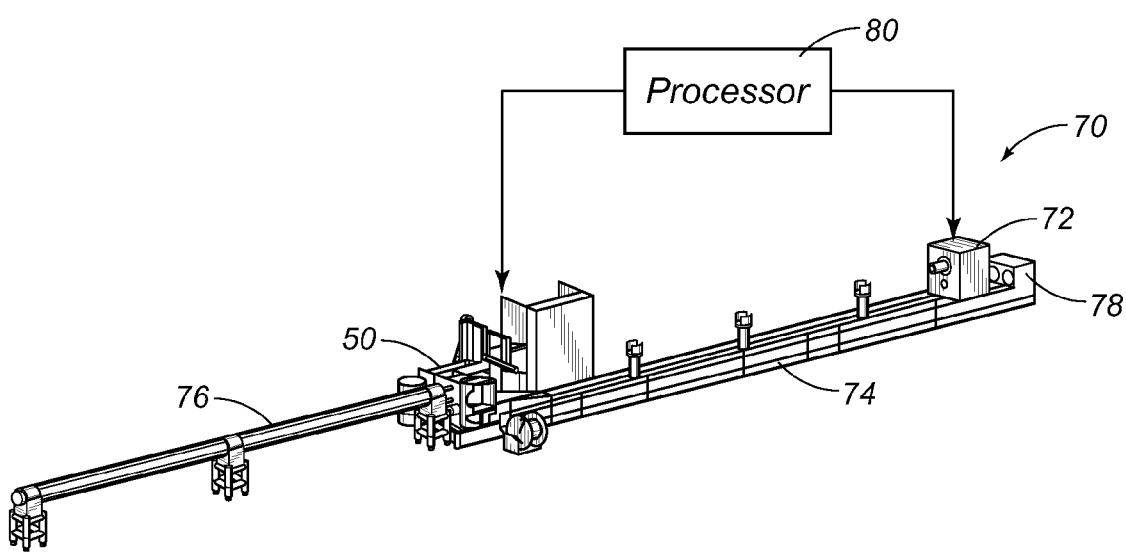
FIG. 4 is a perspective view, of the apparatus of the present invention for the welding of wire wound filtering screens.

FIG. 4 illustrates the overall layout of the machine used for the manufacturing of spiral wound filter screens. Importantly, in FIG. 4, the translating mechanism 72 is particularly illustrated as positioned on the spiral wound filter screen bed 74. The clam-shell assembly 76 is fully illustrated on the opposite end of the machine 50.

In normal use, the translating mechanism 72 will receive the tailstock for the filtering screen. The translating mechanism 72 will engage the tailstock for the filtering screen and move from the welding system 50 toward the aft end 78 of the bed 74. The translating mechanism 72 has a linear scale incorporated therein. As a result, it is possible to compensate for any drive train inconsistency which would normally have an adverse effect on pitch and gap. Electronic gearing is used for both tailstock rotation and the translation associated with the translating mechanism 72. These are coupled to the motion of the spindle 14. This technique is more accurate and flexible than mechanical coupling of these axes.

As can be seen in FIG. 4, a processor 80 is interconnected between the translating mechanism 72 and the laser 20. As such, the processor 80 will accurately control the movement of the translating mechanism 72 relative to the gaps that are sensed by the laser 20 between adjacent surfaces of the wrap wire. If the gaps are too great between the adjacent surfaces, then the processor 80 can transmit a suitable signal so as to slow the translating motion of the translating mechanism 72. If the gaps between the adjacent surfaces of the wrap wire are too small, then the processor 80 can transmit a signal to the translator 72 to increase velocity. As a result, the present invention provides a superior gap-control mechanism for producing such filtering screen.

Figure 5:
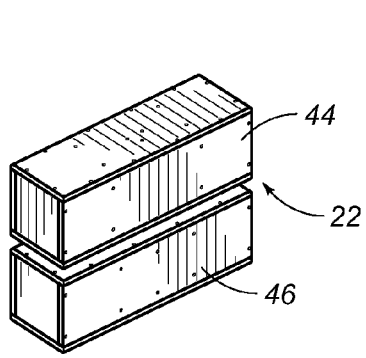
FIG. 5 is a perspective view of the air cushioning mechanism of the present invention.

FIG. 5 shows an isolated view of the air cushion 22 of the present invention. The air cushion 22 includes upper chamber 44 and lower chamber 46. The upper chamber 44 will contain two bladders. The upper chamber 44 is moved only once to initially position the height of the weld head 52 by using the motor and screw drive 64. The lower chamber 46 is coupled to the bladders within the upper chamber 44 with four rods 48. The lower chamber 46 will have the rolling electrode 32 rigidly mounted to it.

Figure 6:
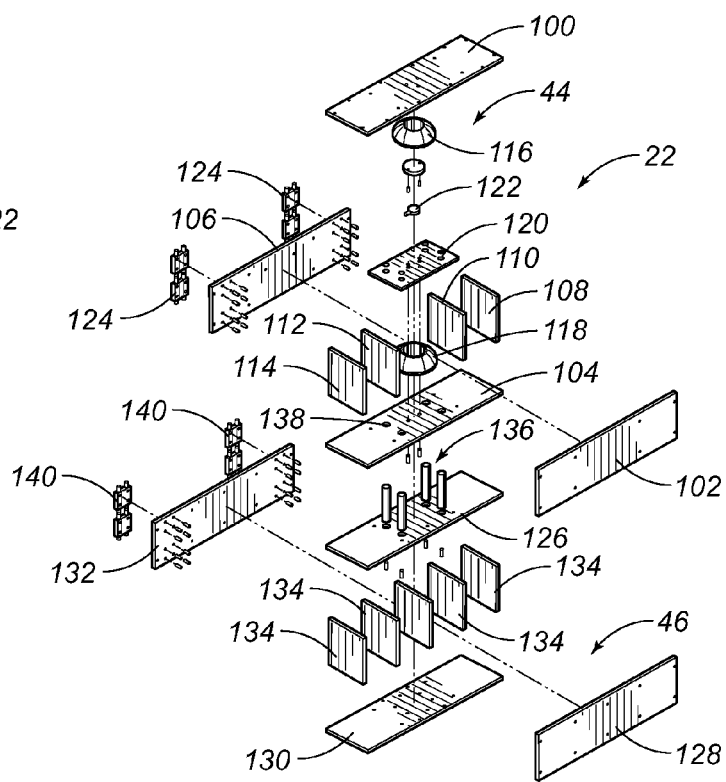
FIG. 6 is a perspective exploded view of the air cushioning mechanism of the present invention.

FIG. 6 shows an exploded view of the air cushion 22. As can be seen, the upper chamber 44 is formed of sides 100, 102, 104 and 106. Various brackets 108, 110, 112 and 114 will be positioned within the upper chamber 44. Importantly, it can be seen that at first air bladder 116 is positioned in the upper portion in the upper chamber 44. Another air bladder 118 is positioned below the air spring bracket 120. A load cell 122 will be interposed between the air bladders 116 and 118 within the upper chamber 44. This strain gauge-type load cell is used so as to sense the force that is applied to the rolling electrode by virtue of the air bladders 116 and 118. Runner blocks 124 are located on the outer surface of the side 106 for proper mounting.

The lower chamber 46 also includes sides 126, 128, 130 and 132. The sides are joined together so as to form a suitable box. Brackets 134 are located within the lower chamber 46 so as to provide structural stability therein. Side 128 has four rods 136 affixed thereto. Rods 136 will extend through the holes 138 in the bottom side 104 of the upper chamber 44 so as to be mounted with the plate 120. As a result, the four rods 136 serve to connect the lower chamber 46 with the air spring plate 120. Runners 140 are provided on the outer surfaces of the plate 132 for mounting to the machine 50.

Figure 7:
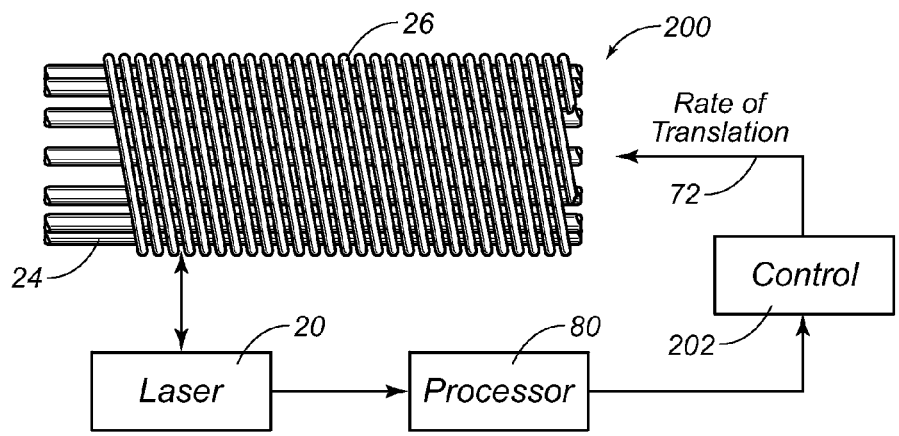
FIG. 7 is a diagrammatic illustration of the method of the present invention.

FIG. 7 shows the method 200 of the present invention. As can be seen in FIG. 7, the wrap wire 26 has been wrapped around the rib wires 24 in the desired method. Laser 20 is directed toward the gaps between adjacent surfaces of the wrap wire 26 and the rib wires 24. Processor 80 is connected to the laser 20 so as to process the measured gaps detected by the laser 20. Processor 80 is then connected to a control mechanism 202 associated with the translating mechanism 72.

In the process of the present invention, the rib wire 24 is suitably rotated. The wrap wire 26 is wrapped around the rib wire 24. Each intersection of the wrap wire 26 with the rib wires 24 is welded. The laser 20 will then measure a gap between the adjacent surfaces of the welded wrap wire. The rate of translation of the translating mechanism 72 is suitably adjusted by controller 202 relative to the measured gap as sensed by laser 20 and processed by processor 80. The laser 20 operates by detecting the reflected light as the laser 20 encounters a gap between the surfaces of the wrap wire 26. As stated earlier, the electrode rolls along the surface of the wrap wire 26. The electrode is then fired upon contact of the wrap wire 26 with the rib wire 24.

The present invention has several advantages over the prior art. By using a laser-based gauging system, it is possible to measure the gap in real time. This allows for compensation for wire width or any other variables that can cause gap variations. By using the feedback from the laser 20, it is possible to change the rate of translation which controls the pitch of the wrap and which, in turn, controls the gap between the wires.

The laser feedback can be also recorded so as to create a permanent record of the quality of the filter screen. In the prior art, this would be a tedious manual process. By using the laser 20, and the processor 80, it is possible to measure the entire screen for process and quality control purposes. In addition to logging the screen gap, the present invention also monitors and stores all system and welding variables. This permanent data log is used for quality control purposes.

The automatic closed loop control of the pressure of the welding head is achieved by using an adjustable force air bladder and a strain gauge load cell to measure the resultant force. This is a critical weld variable which must be programmed and controlled in real time to ensure quality welds. The use of air bladders allows the welding head 52 to respond to variations in the height of the weld without arcing and damaging the surface of the filter screen. Traditional air cylinders are less responsive due to the static friction which occurs each time the cylinder piston stops and reverses direction. Prior art systems that used counterbalance weights were less responsive due to high inherent inertia of the weights. The present invention has programmable weld firing timing based upon spindle position feedback. In producing the filtering screen, the weld timing is a critical variable. The system of the present invention of adjustable timing allows the weld firing position to be preprogrammed and then optimized for each part.

The incorporation of a linear scale into the tailstock which the pulls the screen is able to compensate for any drive train inconsistency. As such, any adverse effects on pitch and gap can be avoided.

The present invention utilizes mid-frequency resistance welding as controlled by the system processor 80. As such, it is possible to program weld time and power. Mid-frequency welding allows extremely high welding speeds (i.e. over 60 per second). The special tooling allows both jackets (rib wire and wrap wire only) screens as well as wrapped on pipe to made on a single machine. By using a high speed motion control computer to monitor and control all process variables, the screen gap accuracy is enhanced. By using electronic gearing, both the tailstock rotation and translation are coupled to the motion of the spindle. This technique is more accurate and flexible than mechanical coupling of these axes.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for manufacturing wire wound filter screen comprising:
   a frame;
   a spindle means rotatably mounted on said frame, said spindle means for supporting rib wires in longitudinal orientation;
   a wire guide means positioned adjacent to said spindle, said wire guide means for delivering wrap wire around the rib wires as said spindle means rotates said rib wires;
   an electrode means for welding the wrap wire to the rib wires at each intersection of wrap wire and rib wires, said electrode means being a rolling electrode having a periphery in contact with the wrap wire as the wire guide means delivers the wrap wire onto the rib wires;
   a translating means positioned on said frame, said translating means for moving the rib wires and the welded wrap wire longitudinal along said frame;
   a laser means positioned adjacent said spindle means on said frame, said laser means for measuring a gap between adjacent surfaces of said wrap wire as the wrap wire is welded to the rib wires; and
   a processor means connected to said laser means, said processor means controllably connected to said translating means so as to adjust a rate of translation of the rib wires relative to the measured gap.

2. The apparatus of claim 1, said processor means further comprising:
   a humanly perceivable display indicative of the measured gap produced by said laser means.

3. An apparatus for manufacturing wire wound filter screen comprising:
   a frame;
   a spindle means rotatably mounted on said frame, said spindle means for supporting rib wires in longitudinal orientation;
   a wire guide means positioned adjacent to said spindle, said wire guide means for delivering wrap wire around the rib wires as said spindle means rotates said rib wires;
   an electrode means for welding the wrap wire to the rib wires at each intersection of wrap wire and rib wires, said electrode means being a rolling electrode having a periphery in contact with the wrap wire as the wire guide means delivers the wrap wire onto the rib wires;
   a translating means positioned on said frame, said translating means for moving the rib wires and the welded wrap wire longitudinal along said frame; and
   an air cushioning means connected to said electrode means for urging said rolling electrode to maintain contact with the wrap wire during the rotation of said spindle means.

4. The apparatus of claim 3, said air cushioning means comprising:
   an air bladder structure cooperatively interconnected to said rolling electrode.

5. The apparatus of claim 4, said air bladder structure comprising:
   an upper chamber having at least one air bladder therein; and
   a lower chamber coupled to said air bladder, said rolling electrode being rigidly supported on said lower chamber.

6. The apparatus of claim 4, said air cushioning means further comprising:
   a strain gage load cell means coupled to said air bladder structure for measuring and controlling application of forces by said air bladder onto said rolling electrode.

7. An apparatus for manufacturing wire wound filter screens comprising:
   a frame;
   a spindle means rotatably mounted on said frame, said spindle means for supporting rib wires in longitudinal orientation;
   a wire guide means positioned adjacent to said spindle, said wire guide means for delivering wrap wire around the rib wires as said spindle means rotates said rib wires;
   an electrode means for welding the wrap wires to the rib wires at each intersection of wrap wire and rib wires;
   a translating means positioned on said frame, said translating means for moving rib wires and the welded wrap wire longitudinal along said frame;
   a laser means positioned adjacent to said spindle on said frame, said laser means for measuring a gap between adjacent surfaces of said wrap wire as the wrap wire is welded to the rib wires; and
   a processor means connected to said laser means, said processor means controllably connected to said translating means so as to adjust a rate of translation of the rib wires relative to the measured gap.

8. An apparatus for manufacturing wire wound filter screens comprising:
   a frame;
   a spindle means rotatably mounted on said frame, said spindle means for supporting rib wires in longitudinal orientation;
   a wire guide means positioned adjacent to said spindle, said wire guide means for delivering wrap wire around the rib wires as said spindle means rotates said rib wires;
   an electrode means for welding the wrap wires to the rib wires at each intersection of wrap wire and rib wires;
   a translating means positioned on said frame, said translating means for moving rib wires and the welded wrap wire longitudinal along said frame;
   a laser means positioned adjacent to said spindle on said frame, said laser means for measuring a gap between adjacent surfaces of said wrap wire as the wrap wire is welded to the rib wires; and
   an air cushioning means connected to said electrode means for urging a rolling electrode to maintain contact with the wrap wire during the rotation of said spindle means.

9. An apparatus for manufacturing wire wound filter screens comprising:
   a frame;
   a spindle means rotatably mounted on said frame, said spindle means for supporting rib wires in longitudinal orientation;

a wire guide means positioned adjacent to said spindle, said wire guide means for delivering wrap wire around the rib wires as said spindle means rotates said rib wires;

an electrode means for welding the wrap wire to the rib wires at each intersection of wrap wire and rib wires;

a translating means positioned on said frame, said translating means for moving rib wires and the welded wrap wire longitudinal along said frame; and an air cushioning means connected to said electrode means for urging said electrode means to maintain contact with the wrap wire during the rotation of said spindle means.

10. The apparatus of claim 9, said electrode means being a rolling electrode having a periphery in contact with the wrap wire as the wire guide means delivers the wrap wire onto the rib wires, said air cushioning means comprising:

an air bladder structure cooperatively interconnected to said rolling electrode so as to urge the periphery of said rolling electrode to maintain contact with the wrap wire during the rotation of the spindle means.

11. The apparatus of claim 10, said air bladder structure comprising:

an upper chamber having at least one air bladder therein; and a lower chamber coupled to said air bladder, said rolling electrode being rigidly support on said lower chamber.

12. The apparatus of claim 10, said air cushioning means further comprising:

a strain gage load cell means coupled to said air bladder structure for measuring and controlling application of forces by said air bladder onto said rolling electrode.

13. The apparatus of claim 9, further comprising:

a laser means positioned adjacent said spindle means on said frame, said laser means for measuring a gap between adjacent surfaces of said wrap wire as the wrap wire is welded to the rib wires; and a processor means connected to said laser means, said processor means controllably connected to said translating means so as to adjust a rate of translation of the rib wires relative to the measured gap.

\* \* \* \* \*